United States Patent [19]

McClure

[11] 4,430,902
[45] Feb. 14, 1984

[54] APPARATUS AND METHOD OF CONVERTING RECIPROCATING MOTION TO ROTARY MOTION

[76] Inventor: Kenneth S. McClure, R.R. #1, Thayer, Kans. 66776

[21] Appl. No.: 284,372

[22] Filed: Jul. 17, 1981

[51] Int. Cl.³ ............................................. F16H 19/04
[52] U.S. Cl. ........................................................ 74/31
[58] Field of Search ....................................... 74/29–35

[56] References Cited

U.S. PATENT DOCUMENTS

| 20,533 | 6/1858 | Widmer | 74/30 |
|---|---|---|---|
| 585,851 | 7/1897 | Pederson | 74/30 |
| 608,241 | 8/1898 | Wilburn | 74/30 |
| 636,254 | 11/1899 | Gamble | 74/30 |
| 668,958 | 2/1901 | Hallett | 74/30 |
| 712,361 | 10/1902 | Clark | 74/30 |
| 1,362,901 | 12/1920 | Simonton | 74/32 |
| 1,381,046 | 6/1921 | Winegarden | 74/30 |
| 2,244,607 | 6/1941 | Blakeley | 74/31 |
| 2,510,082 | 6/1950 | Davey | 74/31 |
| 2,821,861 | 2/1958 | Dunn | 74/30 |

FOREIGN PATENT DOCUMENTS

| 379215 | 8/1964 | Switzerland | 74/29 |
|---|---|---|---|
| 9687 | of 1897 | United Kingdom | 74/31 |

Primary Examiner—Gary L. Smith
Assistant Examiner—Lloyd A. Gall
Attorney, Agent, or Firm—John H. Widdowson

[57] ABSTRACT

An apparatus and method of converting reciprocating motion to rotary motion. The apparatus includes an endless rack assembly reciprocally mounted for reciprocating motion through a stroke; a cooperating pinion rotatably mounted on a rotatable element operative to track the rack assembly; and lock means cooperating with said rotatable element for blocking rotation of said element during a substantial portion of said stroke. The method comprises reciprocating the rack assembly under control of a power source; causing a first pinion of a rotatable pinion assembly which cooperates with the endless rack assembly to traverse the rack assembly continuously as said rack assembly reciprocates effective to rotate the first pinion continuously in a given direction; using the first pinion to drive a second pinion of the pinion assembly; and using the second pinion to drive a flywheel and an output shaft thereby rendering power output uniform throughout a given cycle.

10 Claims, 9 Drawing Figures

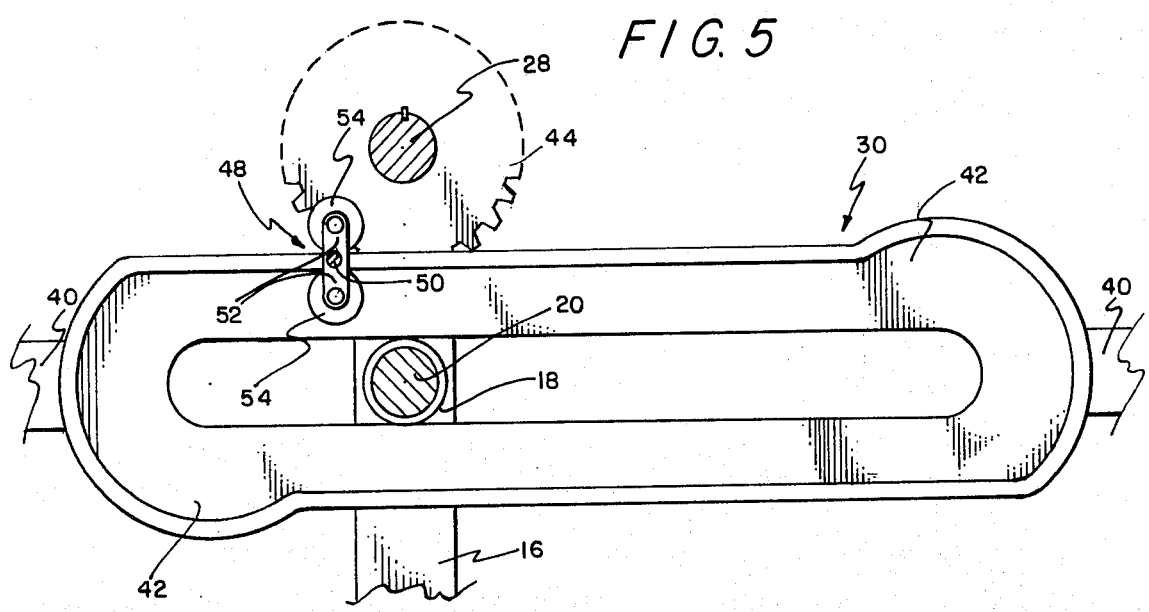
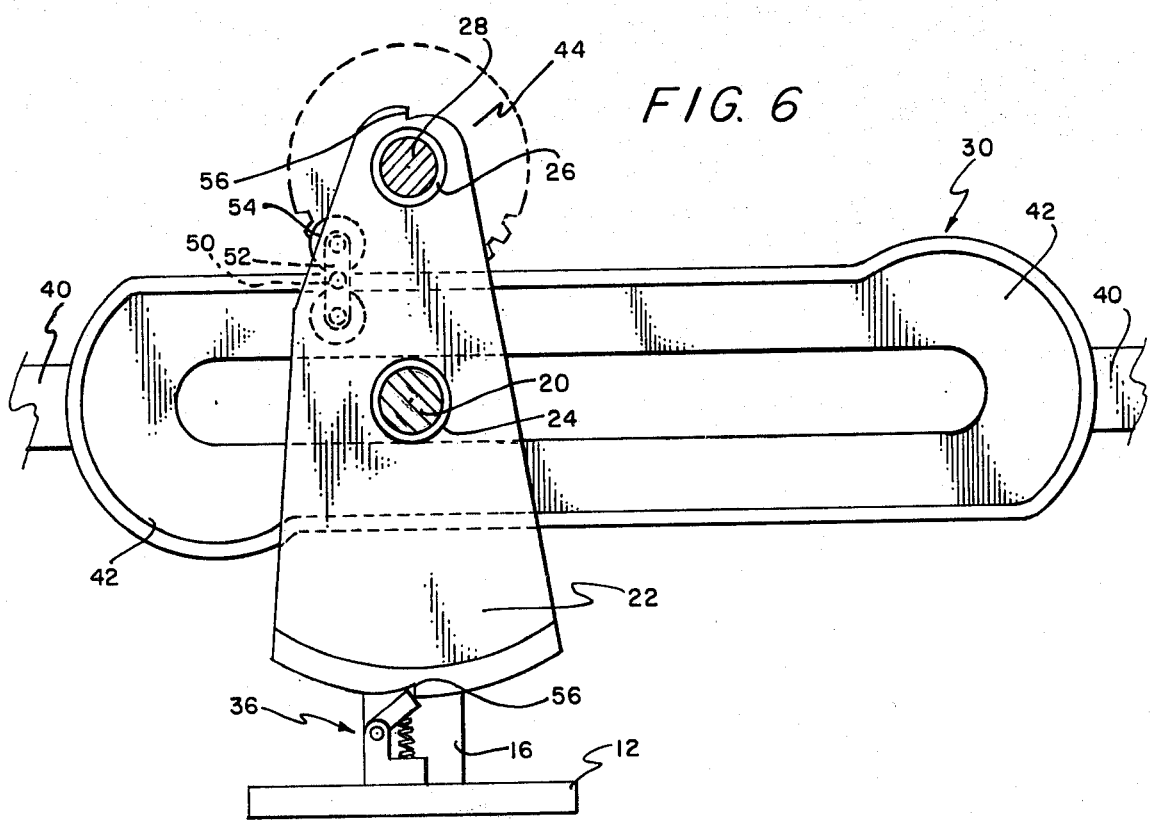

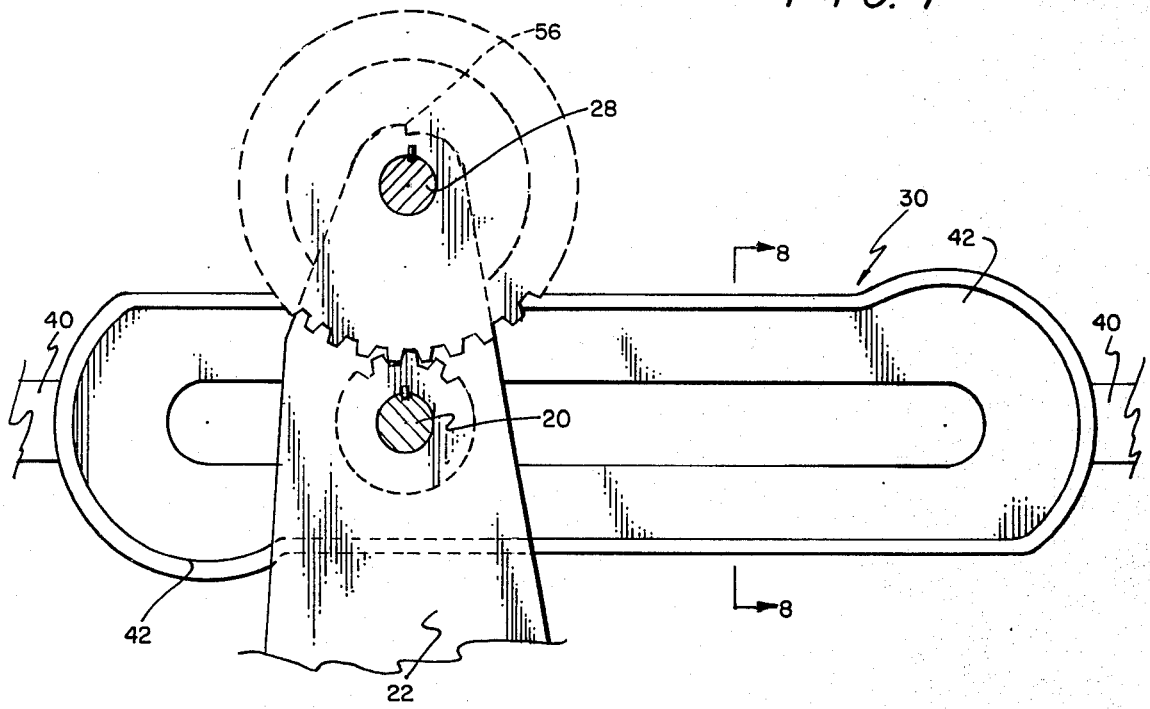
FIG. 7
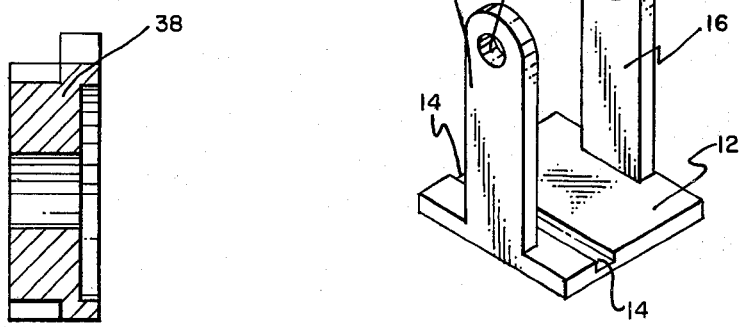
FIG. 8
FIG. 9

APPARATUS AND METHOD OF CONVERTING RECIPROCATING MOTION TO ROTARY MOTION

BACKGROUND OF THE INVENTION

1. Field of the Invention

This invention provides a method and apparatus for converting reciprocating motion to rotary motion. More specifically, this invention is related to an apparatus and method for converting reciprocating motion of varying potential to rotary motion of uniform potential.

2. Description of the Prior Art

U.S. Pat. No. 1,316,437 by Flood discloses a rack and pinion mechanism for engines wherein reciprocating motion of the connecting rods drive a circular internal rack engaging a gear driving the same which is connected to a rotary output driving a flywheel. U.S. Pat. No. 1,687,744 by Webb discloses a somewhat similar arrangement as Flood wherein reciprocation of the pistons operates an internal elongated rack driving a pinion connected to a shaft for output. U.S. Pat. Nos. 233,810 and 1,803,426 by Simmons and Duckworth, respectively, disclose a rotary portion of a drive as the input which drives a pinion gear engageable with an elongated external rack whereby the rotary motion is translated into reciprocating motion. None of the foregoing prior art patents either singly or in combination teach or suggest the specific apparatus and method of this invention.

SUMMARY OF THE INVENTION

This invention accomplishes its desired objects by providing an apparatus and method for converting reciprocating motion of varying potential to rotary motion of uniform potential. The apparatus comprises a base with a pair of support members integrally bound to the base and each support member including a structure defining a common shaft aperture. A common shaft rotatably lodges within the common shaft aperture of each of the support members. The apparatus additionally comprises a rotatable element having a structure defining a pinion aperture and a common shaft aperture wherethrough said common shaft rotatably passes for mounting thereon said rotatable element. An endless rack assembly is reciprocally mounted on said common shaft for reciprocating motion through a stroke. A cooperating pinion assembly is rotatably mounted through and within the pinion aperture of said rotatable element operative to track the endless rack assembly; and lock means is secured to the base cooperating with the rotatable element for blocking rotation of said element during a substantial portion of the stroke. The method comprises providing an elongated endless rack and cooperating rotatable pinion assembly having a first pinion and a second pinion; reciprocating the rack under control of the power source; causing the first pinion to traverse the rack continuously as the rack reciprocates effective to rotate the first pinion continuously in a given direction; using the first pinion to drive the second pinion; and using the second pinion to drive a flywheel and an output shaft thereby rendering power output uniform throughout a given cycle.

It is an object of the invention to provide a novel apparatus and method for converting reciprocating motion of varying potential to rotary motion of uniform potential.

Still further objects of the invention reside in the provision of a method and apparatus for converting, in a reciprocating power source supplying power in varying levels of potential throughout a given cycle, the reciprocating motion to a rotary motion of uniform potential.

These, together with the various ancillary objects and features which will become apparent as the following description proceeds, are attained by this invention, preferred embodiments being shown in the accompanying drawings, by way of example only, wherein:

BRIEF DESCRIPTION OF THE DRAWINGS

FIG. 5 is a vertical sectional view taken in direction of the arrows and along the plane of line 5—5 in FIG. 3;
FIG. 6 is a vertical sectional view taken in direction of the arrows and along the plane of line 6—6 in FIG. 3;
FIG. 7 is a vertical sectional view taken in direction of the arrows and along the plane of line 7—7 in FIG. 3;
FIG. 8 is a vertical sectional view taken in direction of the arrows and along the plane of line 8—8 in FIG. 7;
and
FIG. 9 is a perspective view of the base and having integrally bound thereto the support members.

DETAILED DESCRIPTION OF THE INVENTION

Figure 1:
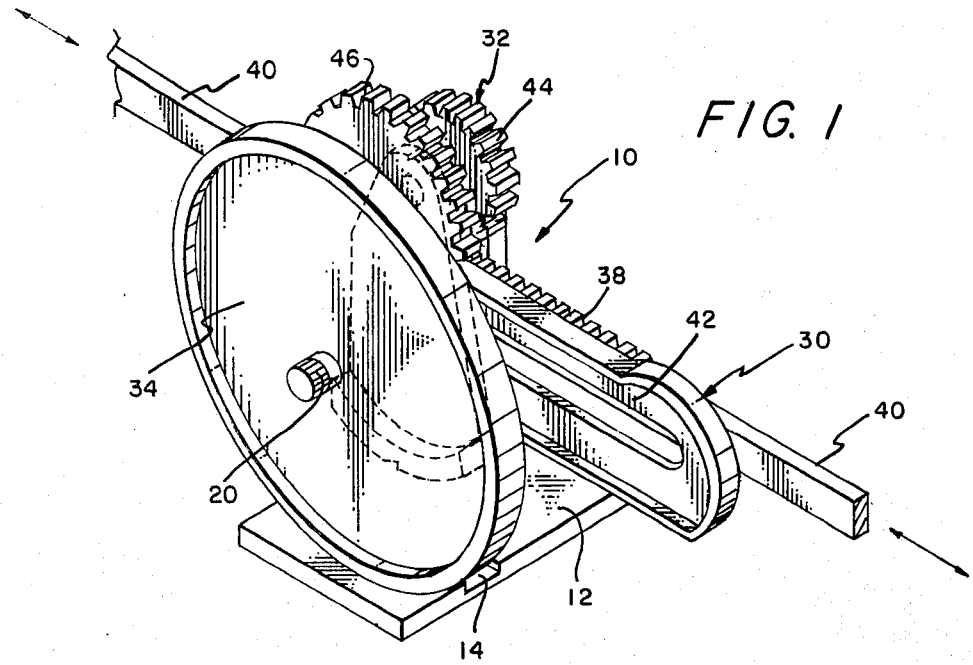
FIG. 1 is a perspective view of the invention.
Figure 2:
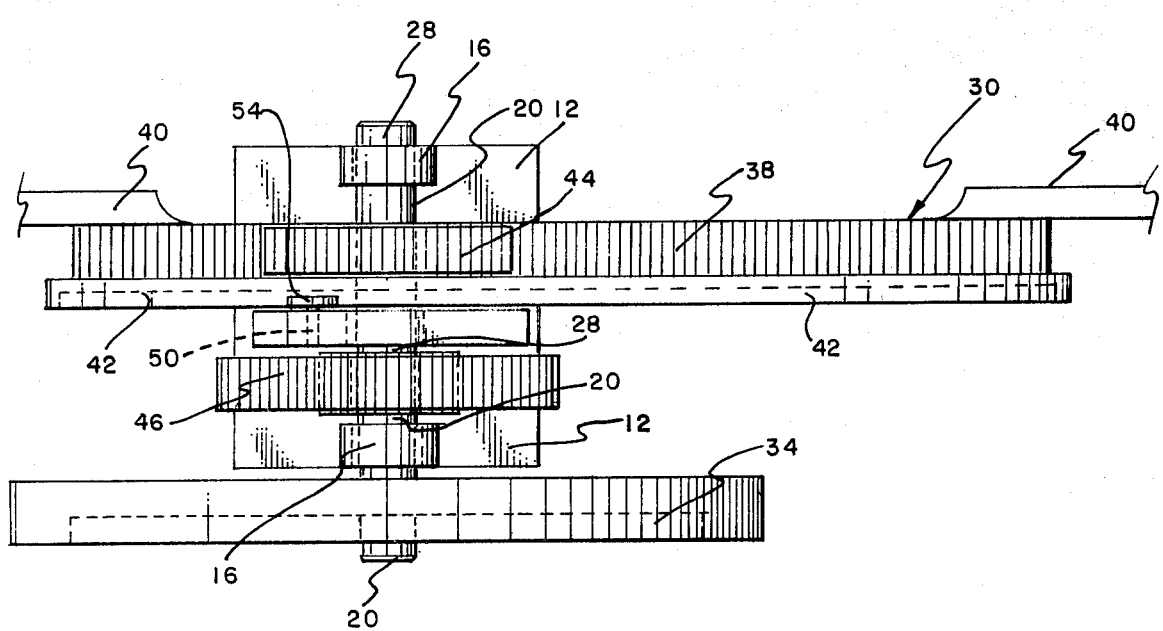
FIG. 2 is a top plan view of the invention.
Figure 3:
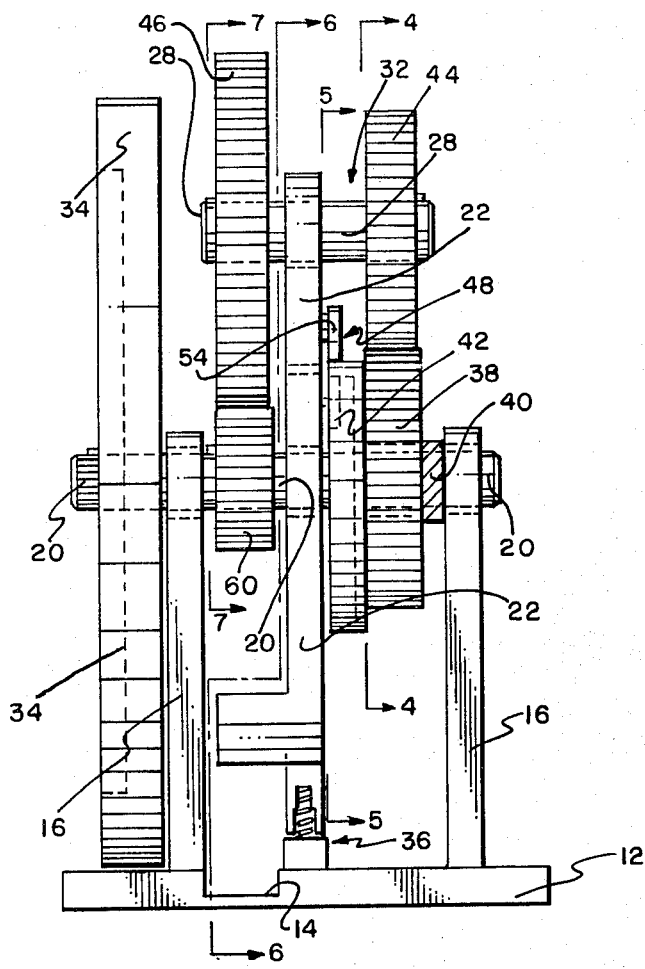
FIG. 3 is a side elevational view of the invention.
Figure 4:
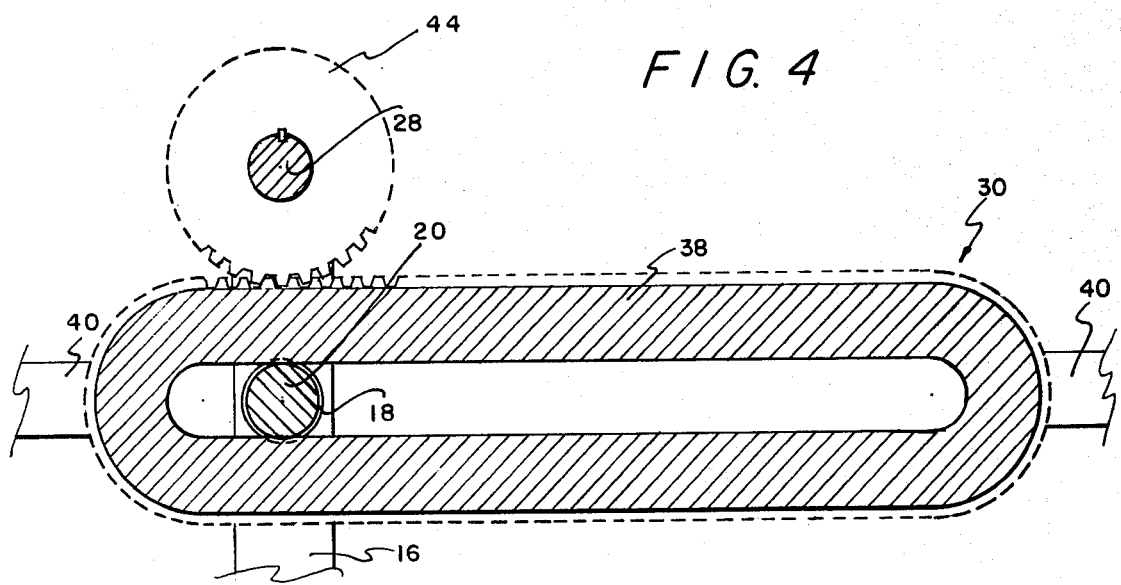
FIG. 4 is a vertical sectional view taken in direction of the arrows and along the plane of line 4—4 in FIG. 3.

Referring in detail now to the drawings, wherein like reference numerals designate similar parts throughout the various views, there is seen an embodiment of the invention, generally illustrated as 10, comprising a base 12 with an elongated rectangular slot 14 and having a pair of support members 16—16 integrally bound thereto with a common shaft aperture 18 on each end of the support members 16—16. A common shaft 20 rotatably lodges within the common shaft apertures 18—18 of each of the support members 16—16. Rotatable element 22 has an element aperture 24 wherethrough the common shaft 20 rotatably passes for supporting and mounting the element 22. Rotatable element 22 also has a pinion aperture 26 which rotatably receives and mounts therethrough a pinion shaft 28. An endless rack assembly, generally illustrated as 30, is reciprocally mounted on the common shaft 20 for reciprocating motion through a stroke. A cooperating pinion assembly, generally illustrated as 32, is rotatably mounted on pinion shaft 28 operative to track the endless rack assembly 30. Flywheel 34 is mounted to and rotates with common shaft 20. Lock means, generally illustrated as 36, is secured to base 12 cooperating with the rotatable element 22 for blocking rotation of the element 22 during a substantial portion of the stroke.

Endless rack assembly 30 comprises an endless oval gear rack 38, reciprocating rods 40—40 bound to the gear rack 38 to provide reciprocal motion and support thereto, and a cam element 42. The rack assembly 30 is elongatedly centrally slotted wherethrough the common shaft 20 passes for support and reciprocating motion through a stroke of the rack assembly 30 from the rods 40—40.

The cooperating pinion assembly 32 includes a first pinion gear 44 rotatably mounted on the pinion shaft 28 and meshes with the rack gear 38 causing the first pinion gear 44 to traverse the rack gear 38 continuously as the rack gear 38 reciprocates from reciprocating rods 40—40, effective to rotate the first pinion gear 44 continuously in a given direction. The assembly 32 also includes a second pinion gear 46 rotatably mounted on the pinion shaft 28 and is rotatably driven by the first pinion gear 44. A cam follower means, generally illustrated as 48, is mounted on rotatable element 22 by follower shaft 50, and comprises a bearing shaft 52 having a pair of bearings 54—54 rotatably mounted thereon to maintain the first pinion gear 44 in contact with the rack gear 38.

Rotatable element 22 has a pair of opposed notches 56—56 on the ends thereof to engage the locking means 36, and the notches 56—56 are equidistant from common shat 20. The surface of the cam element 42 is contoured as illustrated such that the cam follower means 48 is operative to move the rotatable element 22 upwardly (see FIG. 6) with respect to locking means 36, which in a preferred embodiment of the invention as shown in a spring-biased ratchet mechanism, to disable the lock means 36 in order that the rotatable element 22 can pivot the pinion assembly 32 around the oval rack gear 44 and underneath thereof to commence traversing the underneath section of the oval rack gear 44 with a given reverse reciprocating direction of rods 40—40. Cam follower means 48 is off-set from the common center line of the pinion shaft 28 and the common shaft 20 (see FIG. 5) such that the center of shaft 50 is equidistant from the center of pinion shaft 28 and common shaft 20 in order to keep the first pinion gear 44 normal to the oval rack gear 38 while the pinion assembly 32 is rotated around the oval rack gear 38 to the inverted position. As the surface of the cam element 42 raises the rotatable element 22 to disable locking means 36 from one of the notches 56 (see FIG. 6), the rotatable element 22 rotates the pinion assembly 32 around the oval rack 38 to the inverted position until the locking means 36 engages the other notch 56. The locking means 36 prevents the reversal of the rotatable element 22, absorbs any shocks, and prevents damage to the cam element 42.

Simultaneous to first pinion gear 44 driving the second pinion gear 46 by the transfer of rotational force through pinion shaft 28, second pinion gear 46 drives a common shaft gear 60 which is bound to the common shaft 20; this causes the common shaft 20 to turn the flywheel 34 which stores the momentum gained from the initial thrust of rods 40—40 and causes the first pinion gear 44 to rotate around the end of the rack gear 38 to the inverted position at the end of a thrust from rods 40—40. After the rotation of pinion gear 44 around the end thereof and underneath the oval rack gear 38, pinion gear 44 is in the position to continue to transfer power in the same rotational direction from the reverse thrust of oval rack gear 44 caused by the reversed reciprocating motion of rods 40—40. The slot 14 in base plate 12 allows pinion gear 46 to pass therethrough without hitting the bottom of the base plate 12 as the pinion assembly 32 rotates around the rack assembly 30 into the inverted position.

The design of the invention 10 is designed to provide for development of a low piston travel speed internal combustion engine and to supplant the presently utilized eccentric crankshaft which is not efficient during the last quarter of the power stroke. The design provides for even transmittal of force throughout the power stroke and continued even rotation of the common shaft 20 and flywheel 34 between power strokes of rods 40—40.

With continuing reference to the drawings for operation of the invention 10 and the method of converting reciprocating motion to rotary motion with uniform power output in a reciprocating power source supplying power in varying levels of potential through a given cycle, rods 40—40 are connected at either end of pistons, slides, or other similar devices providing reciprocal motion. Rods 40—40 are also attached to the ends of the endless oval rack gear 38, and provide support thereto. Pinion gear 44 meshes and rotatably cooperates with the endless oval rack gear 38 such that when the rods 40—40 reciprocate the oval rack gear 38 under control of the power source (i.e. the pistons, slides, or the like), the first pinion gear 44 traverses the endless oval rack gear 38 continuously to effectively rotate the first pinion gear 44 continuously in a given direction. First pinion gear 44 transfers rotational force through the pinion shaft 28 to the second pinion gear 46 which transfers the same rotational force to gear 60 which is fixed on the common shaft 20. Gear 60 transfers the rotational force through the common shaft 20 to turn the flywheel 34 (and an output shaft) thereby rendering power output uniform throughout a given cycle.

Flywheel 34 stores the momentum gained from the initial thrust of rods 40—40, and as the pinion assembly 32 approaches the end of the endless rack assembly 30, the cam follower means 48 (attached to the rotatable element 22) engages the end of the cam element 42 to lift the notch 56 of the rotatable element 22 away from ratchet locking means 36 to disable the same. The momentum of the flywheel 34 then causes the pinion gear 44 (and the entire pinion assembly 32) to rotate around and underneath the endless oval rack gear 38 (and the entire rack assembly 30) until the ratchet locking means 36 is enabled when it lodges within the other notch 56. The pinion assembly 32 is now in the inverted position and the second pinion gear 46 is now in the position to pass through slot 14 of the base 12. When the pinion assembly 32 is in the inverted position, the first pinion gear 44 is postured to transfer power in the same given rotational direction from the reverse thrust of oval rack gear 38 delivered by the rods 40—40.

While the present invention has been described herein with reference to particular embodiments thereof, a latitude of modification, various changes and substitutions are intended in the foregoing disclosure, and it will appreciate that in some instances some features of the invention will be employed without a corresponding use of other features without departing from the scope of the invention as set forth.

I claim:

1. An apparatus for converting reciprocating motion of varying potential to rotary motion of uniform potential comprising:

a base with a pair of support members integrally bound to said base and each support member including a structure defining a common shaft aperture;

a common shaft rotatably lodging within the common shaft aperture of each of the support members;

a flywheel means bound to an end of said common shaft;

a rotatable element having a structure defining a pinion aperture and an element aperture wherethrough said common shaft rotatably passes for mounting thereon said rotatable element;

an endless rack assembly reciprocally mounted on said common shaft for reciprocating motion through a stroke;

a cooperating pinion assembly rotatably mounted through and within the pinion aperture of said rotatable element operative to track the endless rack assembly; and lock means secured to said base cooperating with said rotatable element for blocking rotation of said element during a substantial portion of said stroke; said rack assembly is formed with a cam element and the rotatable element carries a cam follower means for maintaining the pinion assembly in contact with the rack assembly; the surface of the cam element is so contoured such that the cam follower means is operative to move the rotatable element to disable the lock means.

2. The apparatus of claim 1 wherein said pinion assembly comprises a pinion shaft rotatably mounted through the pinion aperture of said rotatable element, a first pinion gear fixed to one end of said pinion shaft, and a second pinion gear fixed to the other end of said pinion shaft to be rotationally driven by the first pinion gear.

3. The apparatus of claim 2 additionally comprising a common shaft gear bound to the common shaft and meshing with the second pinion gear to be driven by same in order to cause the common shaft to turn the flywheel.

4. The apparatus of claim 3 wherein said rotatable element has a structure defining a pair of opposed notches, said lock means engaging one of said notches through a given stroke until the cam follower means contours an end of said cam element operative to disable the lock means from a notch.

5. The apparatus of claim 4 wherein said rack assembly comprises an endless rack gear meshing with and cooperating with the first pinion gear and driving same with a given stroke.

6. The apparatus of claim 5 wherein said flywheel includes a momentum which causes the rotatable element to rotate the pinion assembly around and underneath the rack assembly after the lock means has been disabled.

7. The apparatus of claim 6 wherein said rotatable element rotates the pinion assembly until the lock means engages one of the opposed notches on said rotatable element.

8. The apparatus of claim 6 wherein said base has a structure defining an elongated slot for passing said second pinion gear when said pinion assembly is in the inverted position.

9. In a reciprocating power source supplying power in varying levels of potential throughout a given cycle, a method of converting reciprocating motion to rotary motion with uniform power output comprising the steps of:

(a) providing an elongated endless rack supported by a base means and cooperating rotatable pinion assembly having a first pinion and a second pinion engaged to a pinion shaft;

(b) securing to a common shaft a rotatable element;

(c) positioning a cam follower means on said rotatable element for maintaining the pinion assembly in contact with a gear rack that meshes with the first pinion;

(d) forming the end of the rack with a cam element;

(e) securing to said base means a lock means that cooperates with said rotatable element for blocking rotation of said element;

(f) contouring the surface of the cam element such that the cam follower means is operative to move the rotatable element to disable the lock means;

(g) reciprocating the rack under control of said power source;

(h) causing the first pinion to traverse the rack continuously as the rack reciprocates effective to rotate the first pinion continuously in a given direction;

(i) using the first pinion to drive said second pinion; and (j) using the second pinion to drive a flywheel and an output shaft thereby rendering power output uniform throughout a given cycle.

10. The method of claim 9 additionally comprising inverting the pinion rack assembly with respect to the endless.

* * * * *